United States Patent

Mori et al.

Patent Number: 5,305,144
Date of Patent: Apr. 19, 1994

[54] MIRROR APPARATUS

[75] Inventors: Keiji Mori, Kariya; Hidekazu Kokita, Toyota, both of Japan

[73] Assignee: Aisin Seiki Kabushiki Kaisha, Aichi, Japan

[21] Appl. No.: 514,890

[22] Filed: Apr. 26, 1990

[30] Foreign Application Priority Data

Apr. 28, 1989 [JP] Japan .................. 1-110827

[51] Int. Cl.$^5$ .............. B60R 1/06; G02B 5/08; G02B 7/18
[52] U.S. Cl. ................... 359/507; 359/841; 359/877; 15/250.003
[58] Field of Search ............... 359/841, 871, 872, 877, 359/507; 15/250 B, 250 R, 250.001, 250.003

[56] References Cited

U.S. PATENT DOCUMENTS

| 3,576,359 | 4/1971 | Cosh | 359/877 |
| 4,506,954 | 3/1985 | Enomoto | 359/877 |
| 4,764,004 | 8/1988 | Yamada et al. | 359/872 |
| 4,770,522 | 9/1988 | Alten | 359/877 |
| 4,786,156 | 11/1988 | Kotani et al. | 359/872 |
| 4,832,477 | 5/1989 | Torii et al. | 359/877 |
| 4,877,214 | 10/1989 | Toshiaki et al. | 359/877 |
| 4,915,493 | 4/1990 | Fisher et al. | 359/877 |
| 4,930,370 | 6/1990 | Yoshida | 359/877 |
| 4,940,322 | 7/1990 | Hamamoto et al. | 359/873 |
| 5,007,722 | 4/1991 | Mori et al. | 359/507 |
| 5,037,189 | 8/1991 | Fujie et al. | 359/507 |

FOREIGN PATENT DOCUMENTS 59-8548  1/1984  Japan .................. 359/507

Primary Examiner—Bruce Y. Arnold
Assistant Examiner—R. D. Shafer
Attorney, Agent, or Firm—Finnegan, Henderson, Farabow, Garrett and Dunner

[57] ABSTRACT

A mirror apparatus comprising a frame adapted to be rotatably mounted on the side of a vehcile body, a first case secured to one side of the frame for defining a first space therebetween, a mirror movably mounted on the first case and rotatable about a central pivot point and an adjusting mechanism that is mounted in the first space for adjusting the position of the mirror.

13 Claims, 3 Drawing Sheets

MIRROR APPARATUS

BACKGROUND OF THE INVENTION

1. Field of the Invention

The present invention relates to a mirror apparatus and in particular to a mirror apparatus to be mounted to the outside of a vehicle.

2. Description of the Prior Art

An example of a conventional mirror apparatus is disclosed in Japanese Patent Laid-Open Publication No. 60-244640 published without examination Dec. 4, 1985. In the conventional mirror apparatus, a frame is secured with a case in which a movable mirror and a driving mechanism for moving the mirror are arranged so that the mirror is located at the outside. The frame and the case are enclosed within a body that acts as an outer shell and which is secured to one side of a vehicle body.

Although it is desirable from a design and aesthetic viewpoint to have a thinner mirror apparatus, the accommodation of the frame and the case within the frame prevents the construction of a thinner mirror apparatus. In addition, due to additional functions performed by the control circuit, such as a function for eliminating water drops from the mirror, the control circuit has to be enlarged, thereby expanding the size of the mirror apparatus.

SUMMARY OF THE INVENTION

It is, therefore, an object of the present invention to provide a mirror apparatus for a vehicle that is thinner, from the front of the mirror to the back of the body containing the mirror, while still accommodating the various operational components.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, a mirror apparatus is comprised of a frame adapted to be rotatably mounted on the side of a vehicle body, the frame having a wall portion, a first case secured to one side of the frame and spaced from the wall portion to define a first space between the frame and the first case, a mirror movably mounted on the first case exterior the first space and rotatable about a central pivot point, and adjusting means engagable with the mirror for adjusting the position of the mirror, the adjusting means being mounted in the first space.

BRIEF DESCRIPTION OF THE DRAWINGS

The accompanying drawings, which are incorporated in and constitute a part of this specification, illustrate one embodiment of the invention and, together with the description, serve to explain the objects, advantages and principles of the invention.

DESCRIPTION OF THE PREFERRED EMBODIMENT

Reference will now be made in detail to the present preferred embodiment of the invention, an example of which is illustrated in the accompanying drawings.

Figure 1:
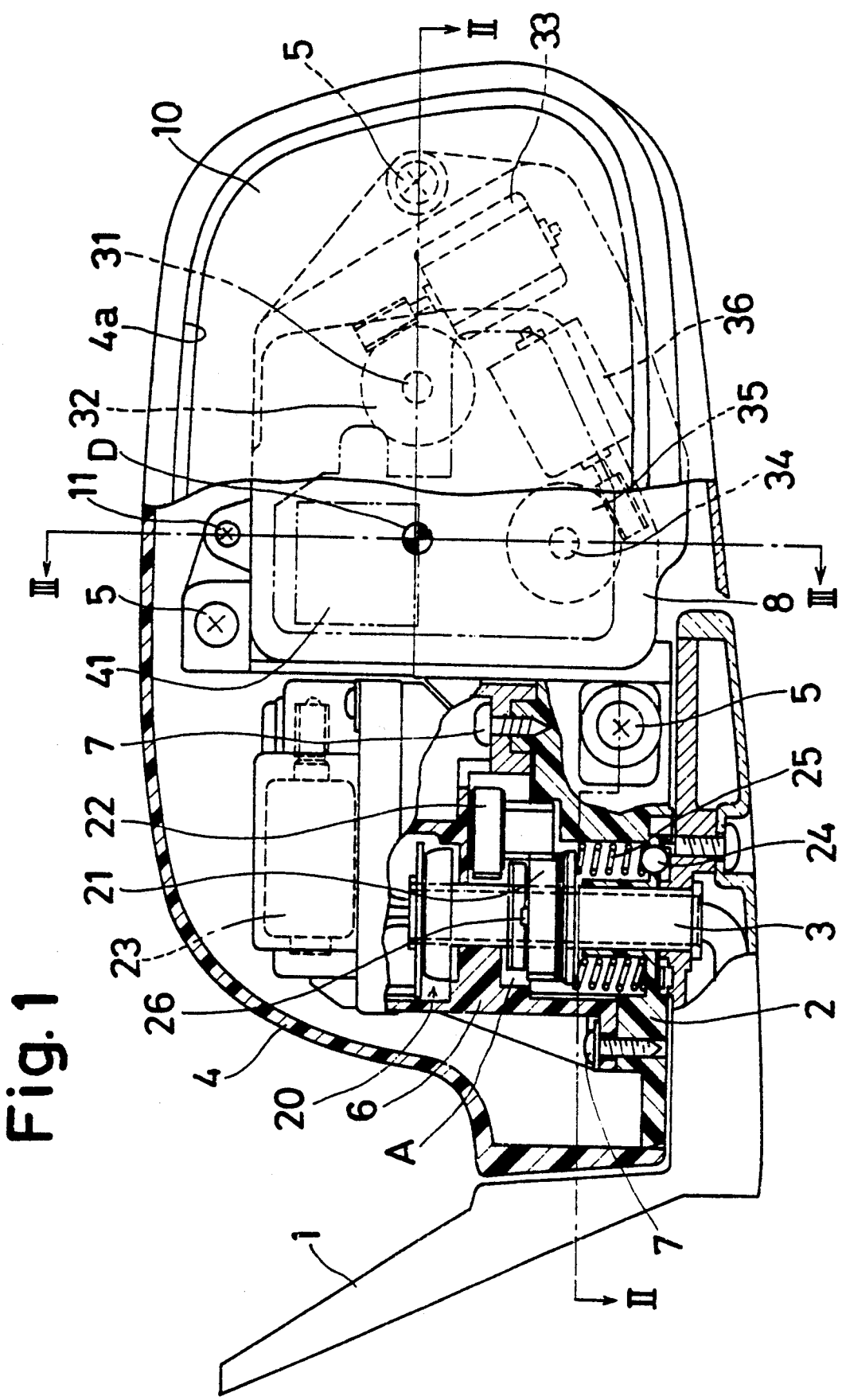
FIG. 1 is a front view with a partial cross-section of a mirror apparatus constructed in accordance with the present invention.
Figure 2:
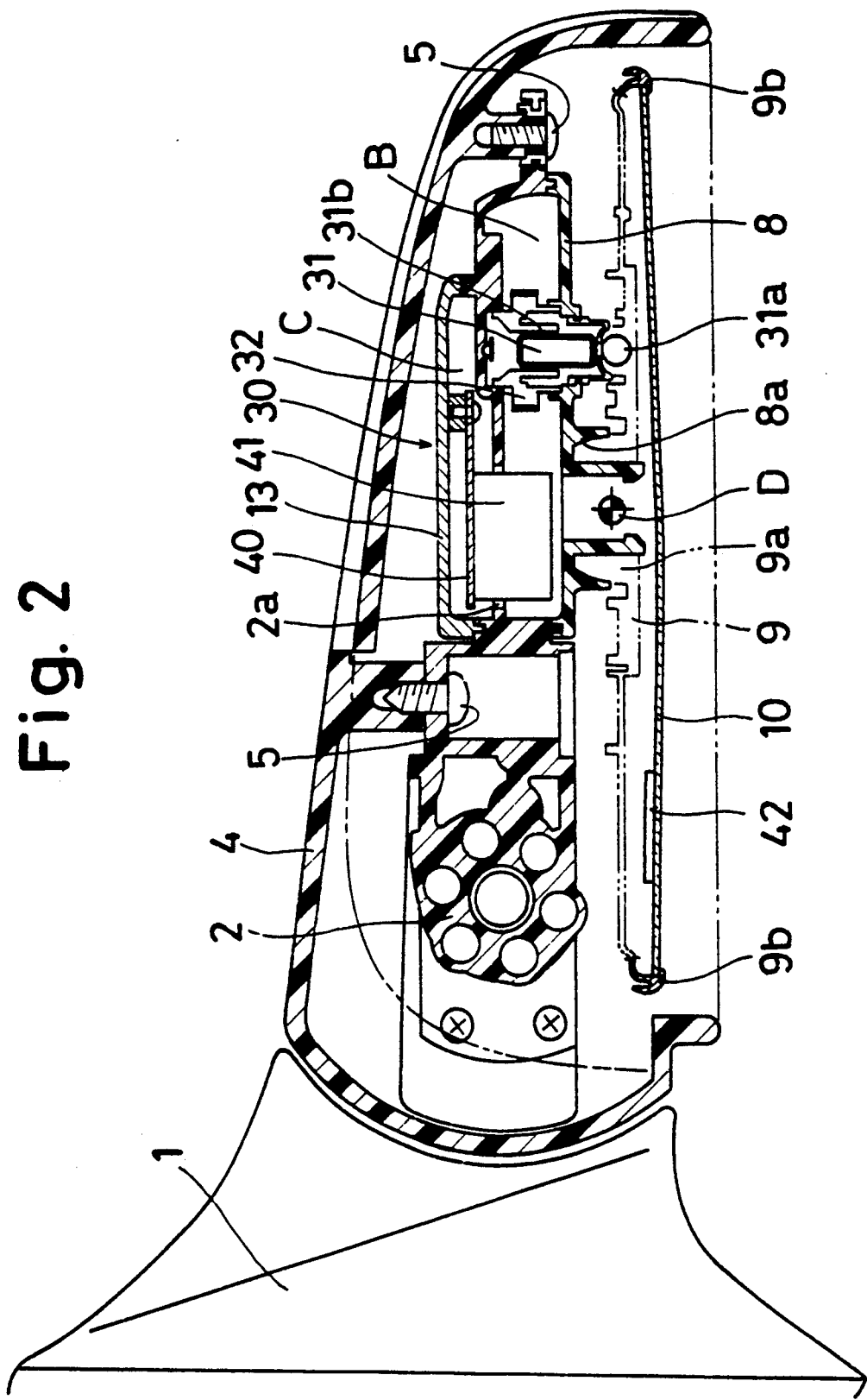
FIG. 2 is a cross-sectional view taken along line II—II in FIG. 1.

Referring to FIGS. 1 and 2, a frame 2 is rotatably mounted via a shaft 3 to a base 1 which is secured to a side of a vehicle body (not shown). A body 4 is secured to frame 2 via screws 5. Body 4 includes an open portion 4a which defines an outer configuration of the frame 2.

Housing 6 is fixedly mounted on frame 2 via screw 7 and a folding mechanism 20 is accommodated within a space A which is defined between frame 2 and housing 6. A first gear 21 is fixedly mounted on shaft 3 via torque limiter 26. First gear 21 is set to be rotated by a torque above the determined value. First gear 21 is in meshed engagement with a second gear 22 which is rotatably supported by the frame 2 and the housing 6. The second gear 22 is operatively connected to a motor 23 via a reducer (not shown). Also, a ball 24 is provided on frame 2 and is engaged by spring 25 in such a way as to be movable in the vertical direction, as seen in FIG. 1. Ball 24 is in engagement with a concave shape in base 1 by a spring 25 which is biased continually toward base 1, thereby maintaining the position of frame 2 with respect to base 1. The torque required to disengage ball 24 from base 1 is set to be smaller than the set torque of the torque limiter 26.

Under the foregoing construction, when motor 23 is turned on, second gear 22 begins to rotate about its axis and to move around first gear 21. Due to the movement of second gear 22 around first gear 21, engagement between ball 24 and the base 1 is released and frame 2 is rotated about shaft 3. Thus, a foldable or normal condition is obtained.

Figure 3:
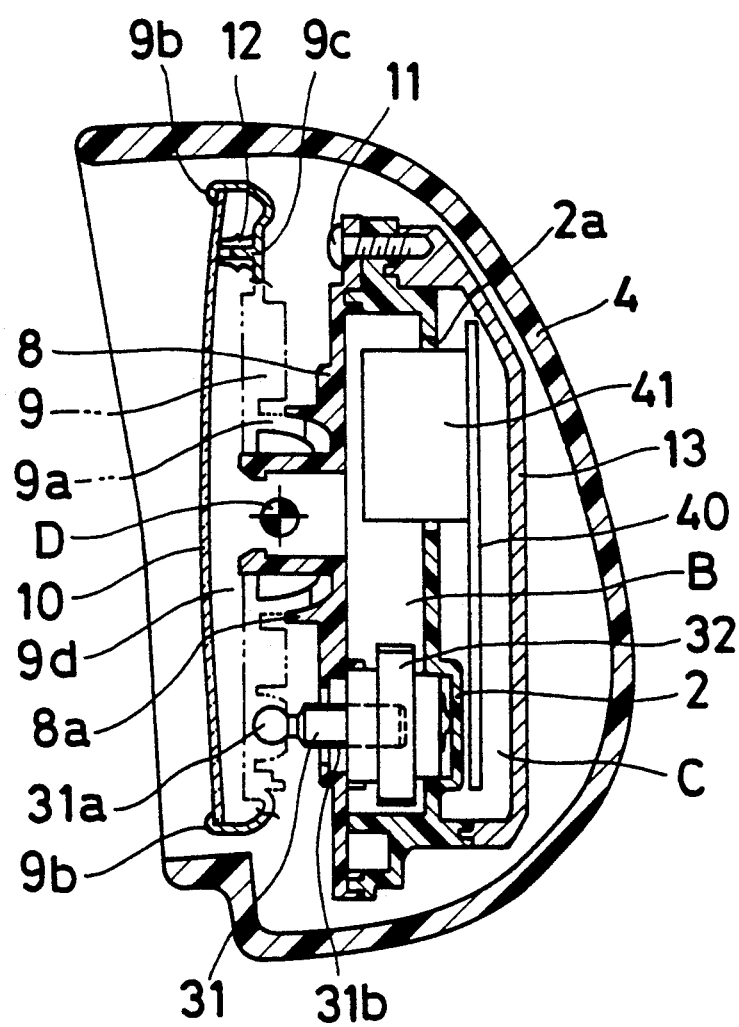
FIG. 3 is a cross-sectional view taken along line III-—III in FIG. 1.

As illustrated in FIGS. 1 through 3, a first case 8 is secured via a screw 11 to one side of frame 2 and is spaced from a wall portion of frame 2 so as to define a first space B between first case 8 and frame 2. A bearing 8a, which has a semi-spherical concave shape, is formed on the outside of the first case 8, at the open portion 4a of the body 4. A mirror 10 is positioned within the open portion 4a of the body 4, and is held by a holder 9. Holder 9 includes a shaft portion 9a which has a semi-spherical convex shape. Shaft portion 9a is fitted into bearing 8a of the first case 8 so that the mirror 10 is movably held by the first case 8 and is movable about a pivot center D, or an axis of shaft 9a.

Mirror 10 is engaged at the outer periphery thereof with a plurality of pawls 9b formed on holder 9 and is in abutment with an elastic member 12 via projections 9c of the holder 9 (best seen in FIG. 3). Mirror 10 is therefore held by a connecting portion consisting of pawls 9b and elastic members 12, which act in opposite directions to retain the mirror so that there is a space between holder 9 and the mirror, thereby enabling the vibration of the mirror 10 relative to the holder 9. Thus, a third space 9d is defined between holder 9 and mirror 10.

An angle adjusting mechanism 30 is mounted in the first space B and has a rod 31 with a spherical portion 31a which is movable at a right side of the pivot center D, as seen in FIG. 1. The rod 31 has a threaded portion 31b which is in meshed engagement with a gear 32. The gear 32 is operatively connected to a motor 33 via a reducer (not shown). When the motor 33 is turned on, the resulting rotating torque or force rotates the gear 32, thereby advancing or retracting the rod 31. Then, the mirror 10 is moved about the pivot center D in the direction of X, or the horizontal direction as seen in FIG. 1.

Also, a second rod 34 of the angle adjusting mechanism 30 is in abutment with the holder 9 at its spherical portion 31a. The rod 34 has a threaded portion 31b which is in meshed engagement with a gear 35. The gear 35 is operatively connected to a motor 36 via a reducer (not shown). When the motor 36 is turned on, the resulting rotational torque or force rotates the gear 35, thereby advancing or retracting the rod 34. The mirror 10 is thereby moved upward or downward about the pivot center D in the direction of Y or in the vertical direction in FIG. 1. Thus, the angular position of the mirror 10 can be adjusted by driving the motor 33 and/or the motor 36.

As is apparent from the foregoing description, the angle adjusting mechanism 30 is mounted in the first space B. This means that frame 2 acts as a portion of first case 8. Thus, the size of the first case 8 can be reduced, thereby attaining a reduction in size of the mirror apparatus in the vertical direction, as viewed in FIG. 2.

As shown in FIGS. 1 through 3, at the other side of frame 2 opposite the first space B, a second case 13 is secured to the frame 2 and spaced from the wall portion of frame 2 to define a second space C. The wall portion of frame 2 therefore also acts as a portion of the second case 13.

Within the second space C, a control circuit 40 is positioned in which long components such as transformers, capacitors, and power transistors are concentrated at a location 41 and are extended into the first space B through an opening portion 2a in the frame so as not to interfere with the mechanism 30. Thus, the narrow space within body 4 is effectively used.

A vibrator 42 is provided on the back portion of mirror 10 and is located at a side of the base 1 with respect to the pivot center D. The vibrator 42 is electrically connected to the control circuit 40 via leads (not shown) and vibrates the mirror 10 upon receipt of an order signal from the control circuit 40. Upon actuation of the vibrator 42 by control circuit 40, the mirror 10 is vibrated, thereby dropping or eliminating water drops, debris, and the like.

As detailed above, the mirror 10 can have a thinner configuration by having the frame 2 function as a portion of the first case 8. The space created as a result of attaining a thinner mirror apparatus can be used to accommodate the control circuit 40. Thus, the control circuit 40 can be connected to the vibrator 42 via shorter leads, resulting in reduced radiation of vibrational noise. The mounting of the control circuit 40 within the second space C also assures that the control circuit 40 is waterproof, thereby increasing the reliability thereof.

It should be noted that the control circuit 40 can also perform other functions, such as the memory of a set position of the mirror 10 or the removal of frost on the mirror 10 by the warming thereof.

It will be apparent to those skilled in the art that various modifications and variations could be made in the mirror apparatus of the invention without departing from the scope or spirit of the invention.

Other embodiments of the invention will be apparent to those skilled in the art from consideration of the specification and practice of the invention disclosed therein. It is intended that the specification and examples be considered as exemplary only, with a true scope and spirit of the invention being indicated by the following claims.

What is claimed is:

1. A mirror apparatus comprising:
 a base for fixedly mounting to a side of a vehicle body;
 a frame rotatably mounted on said base, said frame having a wall portion;
 a first case secured to one side of said frame and spaced from said wall portion, said wall portion and said first case defining a first space between said frame and said first case;
 a mirror movably mounted on the exterior of said first case and rotatable about a central pivot point;
 adjusting means engaging said mirror for adjusting the position of the mirror, said adjusting means being mounted in said first space;
 a second case secured fluid tight to another side of the frame, said second case being spaced from the wall portion and having a hollow cup-shaped configuration defining a second space between said frame and said second case, said frame having an opening therethrough laterally spaced from the adjusting means, the first space being in communication with the second space through said opening; and
 a control circuit including a circuit board having electrical components mounted in the second space and extending into the first space through the opening in the frame.

2. A mirror apparatus according to claim 1 wherein the second case has an outer peripheral portion, and said another side of the frame has a corresponding peripheral portion, said peripheral portion of the second case being snugly fit in said peripheral portion of said another side of the frame.

3. A mirror apparatus according to claim 2, further comprising a vibrating device attached to a back portion of said mirror, said vibrating device being operatively connected to said control circuit for receiving a control signal from said control circuit and for vibrating said mirror.

4. A mirror apparatus according to claim 3, wherein said adjusting means includes retracting means for moving said mirror about said central pivot, and driving means operatively connected to said adjusting means for driving said retracting means selectively toward and away from the mirror.

5. A mirror apparatus according to claim 4, wherein said retracting means includes a first movable rod disposed on one side of the mirror for moving the mirror about a central vertical axis.

6. A mirror apparatus according to claim 5, wherein said retracting means further includes a second movable rod diposed at one of an upper and lower portion of the mirror for moving the mirror about a central horizontal axis.

7. A mirror apparatus according to claim 6, wherein said driving means includes a motor.

8. A mirror apparatus according to claim 7, wherein said first case includes bearing means for movably supporting the mirror.

9. A mirror apparatus according to claim 8, wherein said bearing means includes a semi-spherical concave depression formed in said first case.

10. A mirror apparatus according to claim 9, further comprising a holder for supporting the mirror and securing the mirror to said first case, said holder including a shaft portion having a semi-spherical convex shape that is rotatably recieved in the semi-spherical concave bearing of said first case.

11. A mirror apparatus according to claim 10, wherein said holder includes pawls for engaging edge portions of the mirror and a connecting portion for connecting said pawls and said shaft portion, said connecting portion being spaced apart from said mirror to form a third space therebetween.

12. A mirror apparatus according to claim 11, wherein said vibrating device for vibrating said mirror is attached to the back portion of said mirror in said third space defined by said holder.

13. A mirror apparatus according to claim 11, further comprising a flexible member positioned in said third space, wherein said flexible member abuts the back portion of said mirror at one end thereof and receives a projection extending from said connecting portion of said holder at the other end thereof, said flexible member and said projection acting in opposite directions to securely retain the mirror during vibration of said mirror.

* * * * *